US011496364B1

United States Patent
Mellquist et al.

(10) Patent No.: US 11,496,364 B1
(45) Date of Patent: Nov. 8, 2022

(54) LOGICAL RACK CONTROLLER

(71) Applicant: Hewlett Packard Enterprise Development LP, Houston, TX (US)

(72) Inventors: Peter Erik Mellquist, Roseville, CA (US); Bret McKee, Santa Cruz, CA (US); Blaine R. Southam, Windsor, CO (US); Fredrick M. Roeling, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/303,936

(22) Filed: Jun. 10, 2021

(51) Int. Cl.
*H04L 41/0869* (2022.01)
*H04L 41/12* (2022.01)
*H04L 49/00* (2022.01)
*H04L 41/08* (2022.01)
*H04L 45/02* (2022.01)
*G06F 9/4401* (2018.01)

(52) U.S. Cl.
CPC .......... *H04L 41/0869* (2013.01); *H04L 41/08* (2013.01); *H04L 41/12* (2013.01); *H04L 49/70* (2013.01); *G06F 9/4416* (2013.01); *H04L 45/02* (2013.01)

(58) Field of Classification Search
CPC ..... H04L 41/0869; H04L 41/08; H04L 41/12; H04L 49/70; H04L 45/02; G06F 9/4416
See application file for complete search history.

(56) References Cited

U.S. PATENT DOCUMENTS

| 9,384,061 | B1 | 7/2016 | Deivanayagam et al. |
| 10,348,574 | B2 | 7/2019 | Kulkarni et al. |
| 10,860,362 | B2* | 12/2020 | Lal ...................... G06F 9/45541 |
| 10,972,449 | B1* | 4/2021 | Levin ...................... H04L 63/10 |
| 11,153,168 | B1* | 10/2021 | Dhamal Gopalarathnam ............ H04L 41/0869 |
| 2016/0014073 | A1* | 1/2016 | Reddy ................. H04L 41/5096 713/2 |
| 2016/0156522 | A1* | 6/2016 | Jubran .................... H04L 41/12 709/224 |
| 2017/0026235 | A1* | 1/2017 | Famaey ................ H04L 47/827 |
| 2017/0054603 | A1 | 2/2017 | Kulkarni et al. |
| 2019/0327144 | A1* | 10/2019 | Tembey .............. H04L 41/0869 |

OTHER PUBLICATIONS

Amazon Web Services, "Amazon Virtual Private Cloud Connectivity Options: AWS Whitepaper", Jun. 6, 2020, 38 pages.

(Continued)

*Primary Examiner* — Tonia L Dollinger
*Assistant Examiner* — Joseph M Cousins
(74) *Attorney, Agent, or Firm* — Jones Robb PLLC

(57) ABSTRACT

Example implementations relate to a logical rack controller. In an example, a logical rack controller receives an inventory of a plurality of physical computing racks. The logical rack controller receives a logical rack definition that indicates selected physical infrastructure from among the inventory to form a logical rack. The logical rack controller validates the logical rack definition by verifying network connectivity of the selected physical infrastructure. After validation of the logical rack definition, the logical rack controller provides, to a provisioning controller, an interface to the logical rack. The provisioning controller can utilize the interface to access the logical rack.

17 Claims, 6 Drawing Sheets

(56) References Cited

OTHER PUBLICATIONS

Amazon Web Services, "Introducing Five New Amazon EC2 Bare Metal Instances", 4 pages, Feb. 13, 2019, retrieved from internet <https://aws.amazon.com/about-aws/whats-new/2019/02/introducing-five-new-amazon-ec2-bare-metal-instances/>.
DMTF, "Redfish White Paper", Sep. 4, 2018, 16 pages.
Marcon, D. et al.; "PredCloud: Providing predictable network performance in large-scale OpenFlow-enabled cloud platforms through trust-based allacation of resources"; Jul. 21, 2016; 18 pages.
Openstack Foundation, "Understanding Bare Metal service", retrieved on Jun. 9, 2021, 6 pages, retrieved from internet <https://docs.openstack.org/ironic/latest/user/architecture.html>.
Ovhcloud, "vRack", Web page: <https://www.ovh.com/world/solutions/vrack/network-technology.xml>, retrieved on Jan. 14, 2021, 3 pages.
Peng, L. et al.; "A Novel Framework of Distributed Datacenter Networks to Support Intelligent Services: Architecture, Operation, and Solutions"; Dec. 4, 2018; 9 pages.
Wang, R et al.; "Using Empirical Estimates of Effective Bandwidth in Network-Aware Placement of Virtual Machines in Datacenters"; Jun. 2016; 14 pages.
Unified Extensible Firmware Interface (UEFI) Forum, Inc., "Unified Extensible Firmware Interface (UEFI) Specification", Mar. 2021, 2540 pages.

\* cited by examiner

LOGICAL RACK CONTROLLER

BACKGROUND

Computing infrastructure may include compute, storage, and networking devices organized into racks. Servers within a rack may communicate with each other via a top-of-rack switch.

BRIEF DESCRIPTION OF THE DRAWINGS

Various examples will be described below with reference to the following figures.

DETAILED DESCRIPTION

Figure 1:
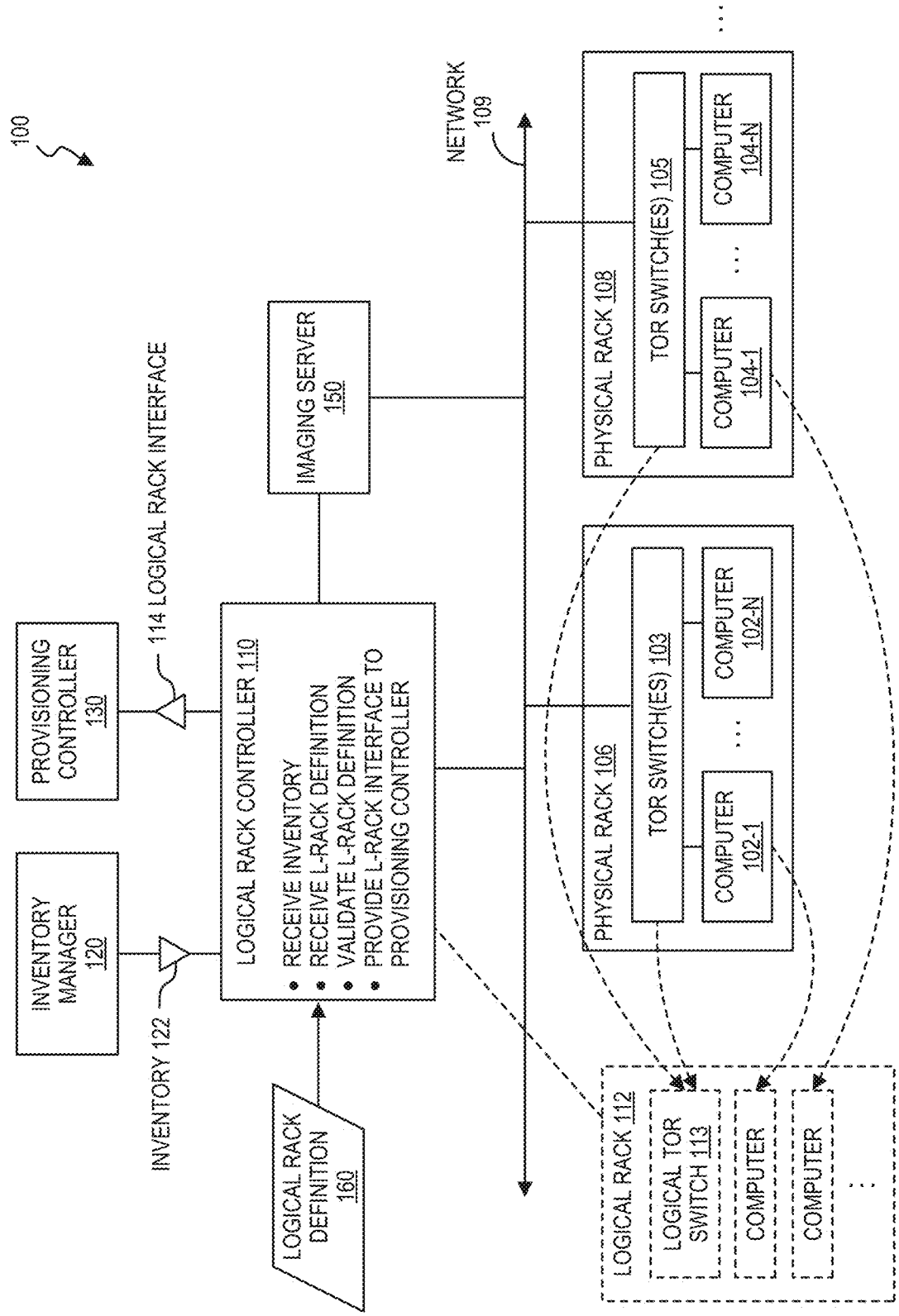
FIG. 1 is a block diagram of an example system that includes a logical rack controller.

Computing infrastructure may include compute devices such as servers, storage devices such as storage arrays, and networking devices such as switches. Various combinations of such infrastructure may be organized into a physical rack, One or more physical racks may form at least part of a private cloud that resides in an operator's data center or at a colocation facility or may form at least part of a public cloud provided by a public cloud vendor for consumption by an operator. An operator may be understood to be an individual, an organization, a company, an institution, or the Ike, and may be an end user of the infrastructure. Infrastructure may be provided to an operator by a vendor and purchased, leased, rented, or paid for on a consumption-basis by the operator. In some cases, the operator may be a customer of the vendor.

Bare metal infrastructure describes physical computing infrastructure, including bare metal servers for example. Virtualization technology such as hypervisors or virtual machines may be run on the bare metal infrastructure. Bare metal infrastructure may be assembled into bare metal racks. Running applications and workloads directly on bare metal infrastructure may provide benefits such as performance, security, and availability (such benefits may be by comparison to virtual infrastructure, for example). Bare metal infrastructure may be useful in certain use cases, such as machine learning operations workloads, high performance computing workloads, computing tasks that involve direct hardware access, and workloads requiring performance, security, and/or availability.

Generally, management of bare metal infrastructure involves intimate familiarity with the details of the physical configuration of the infrastructure. As such, bare metal infrastructure may carry disadvantages that reduce its flexibility. For example, an operator or user of the bare metal infrastructure may be constrained to use what exists within a given physical rack. An operator may be expected to understand how physical racks are physically connected to the physical and logical (e.g., underlay and overlay) networks, how the networks interconnect infrastructure inside a rack and across racks, how power is supplied to the infrastructure, and more, Since an operator needs to be aware of the details of each physical rack, scaling up capabilities to multiple physical racks becomes an expensive and time-intensive operation. Thus, it would be useful to provide complex racks of bare metal infrastructure in a flexible manner that is highly scalable and repeatable across numerous (e.g., hundreds or thousands) of deployments at the lowest cost possible.

To address the foregoing technical challenges, examples described herein relate to a logical rack controller that abstracts management of large collections of infrastructure, such as racks of infrastructure. The logical rack controller can create and maintain a logical rack according to a logical rack definition and using physical infrastructure (e.g., bare metal servers) from different physical racks as the inventory for that logical rack. In some implementations, the different physical racks may be geographically separated. A logical rack may be understood to represent an abstraction of physical infrastructure, or in other words, a logical rack may be a collection of physical infrastructure organized in a different manner than in physical reality, as will be described further below.

The logical rack controller can also maintain a notion of one or more logical top of rack switches that abstract physical top of rack switches that connect the physical infrastructure. The logical rack controller may handle management of the network topology of physical infrastructure within the logical rack, including validation of network connectivity within the logical rack. The logical rack controller can make the logical rack available to a provisioning controller, and the provisioning controller may perform lifecycle management of the logical rack for use by an application workload.

Thus, by virtue of the foregoing, a logical rack may be created from bare metal servers and provided as infrastructure for use by workloads with reduced or minimal intervention by and knowledge of an operator. Accordingly, physical infrastructure may be flexibly configured, deployed, and/or utilized at scale and in a cost-efficient manner. Moreover; the logical rack controller may create a logical rack from infrastructure spanning multiple physical racks with different top of rack switches, without relying on a controller in or for each of the physical racks, thus reducing complexity and cost.

Referring now to the figures. FIG. 1 depicts physical infrastructure, including computers 102-1 through 102-N (collectively computers 102) and computers 104-1 through 104-N (collectively computers 104). The computers 102, 104 may be general purpose servers, high performance computing systems, hyperconverged infrastructure, inferencing or training systems, or other computing devices. The computers 102, 104 may be bare metal infrastructure. Computers may be arranged into an enclosure known as a physical computing rack. For example, computers 102 may be included in a first physical rack 106, and computers 104 may be included in a second physical rack 108. The physical racks 106, 108 may be located in a same data center or in geographically separated data centers. The data centers may be owned by or leased by an operator, and as such, the physical racks 106, 108 form at least part of an on-premise private cloud of the operator.

A physical rack may include other infrastructure, such as storage appliances (e.g., a storage array) and networking infrastructure (e.g., switches), and although the present description relates to assembling computers into a logical rack, the techniques described herein may be used for other infrastructure also. A physical rack may also include one or more top of rack switches (also referred to as TOR switches), which are connected to each of the computers in that physical rack via down links. Multiple TOR switches may be provided in a physical rack for high availability. TOR switches may enable computers to communicate with each other within a rack and to communicate with an intranet (e.g., within the data center) and/or the Internet through uplinks to aggregation switches. In FIG. 1, physical TOR switch(es) 103 are provided in physical rack 106 and physical TOR switch(es) 105 are provided in physical rack 108. Accordingly, the physical racks 106, 108 may communicate across a network 109.

A logical rack controller 110 is provided, which communicates with the infrastructure in the physical racks 106, 108, In some examples, the logical rack controller 110 may be implemented as software instructions encoded on a non-transitory machine readable medium and executed on a hardware processing resource. For example, a processing resource may include a microcontroller, a microprocessor, a central processing unit (CPU), a graphics processing unit (GPU), a data processing unit (DPU), an application-specific integrated circuit (ASIC), a field programmable gate array (FPGA), a system-on-a-chip (SOC), etc., and a machine readable medium may include random access memory (RAM), read-only memory (ROM), electrically erasable programmable read-only memory (EEPROM), flash memory, a hard disk drive, etc. In some examples, the logical rack controller 110 may include electronic circuitry. In some examples, the logical rack controller 110 may be implemented on a smart network interface card (SmartNIC). In some examples, the logical rack controller 110 may be a containerized application (e.g., a container pod) or a virtual machine executing on a hardware processing resource of a computer that is involved in management of the infrastructure in system 100 by communication over the network 109.

The logical rack controller 110 may be in communication with an inventory manager 120 and a provisioning controller 130. In some implementations, the inventory manager 120 may be software executing on a hardware processing resource of a computer. The inventory manager 120 maintains an inventory of the physical infrastructure, such as the computers 102, 104, that is present in the system 100. The inventory may be a data structure. The inventory manager 120 may also add or remove infrastructure from the inventory as infrastructure is added (e.g., by connection to the network 109, etc.) or removed (e.g., by failure, by disconnection to network 109, etc.).

The provisioning controller 130 may be software executing on a hardware processing resource of a computer, and in some cases, may be executing in a cloud and included at or accessible via a cloud-based portal. The provisioning controller 130 may be a Software-as-a-Service (SaaS) portal and may have the functionality described below. The provisioning controller 130 may be a bare metal controller or a bare metal as-a-service controller. The logical rack controller 110, as well as the inventory manager 120 in some instances, may communicate with the provisioning controller 130 via the Internet.

In some implementations, physical racks 106, 108 may be owned by or in possession of an operator and managed by a vendor. In some implementations, physical racks 106, 108 may be delivered to the operator by a vendor for consumption as-a-service by the operator in a pay-per-use financial model. In these implementations, the logical rack controller 110, as well as the inventory manager 120 in some instances, may be implemented as software (e.g., containerized applications or virtual machines) executing on a processing resource of one or more on-premise gateway computers that are at a same data center as one or more of the physical racks 106, 108, and are accessed and utilized by the vendor to manage aspects of the infrastructure. In some implementations, the logical rack controller 110, as well as the inventory manager 120 in some instances, may be executing in a cloud or cloud-based SaaS service. In some implementations, the inventory manager 120 and the logical rack controller 110 are integrated together into a policy controller.

The logical rack controller 110 may consume an infrastructure inventory of the plurality of physical computing racks 106, 108. The inventory may include at least an indication of server infrastructure, such as the computers 102, 104. In some implementations, as part of building the infrastructure by the vendor prior to delivery to the operator (also referred to as Day 0 operations, e.g., at a factory), the gateway computer on which the inventory manager 120 or the logical rack controller 110 is to be executed may be factory preloaded (e.g., with a configuration script) or otherwise provided with a predefined inventory that is a list of the to-be-delivered physical infrastructure. A predefined inventory may also define that a particular physical TOR switch is connected with all computers of a particular rack. The logical rack controller 110 may receive inventory 122 from the inventory manager 120 or may be itself initially preloaded with the inventory. In some implementations, the aforementioned preloaded inventory may be a seed or starting point, and additional inventory details may be determined by an automated discovery process described below.

As mentioned above, an established inventory manager 120 (e.g., as part of Day 1+ operations after delivery of infrastructure to the operator) may also maintain an updated inventory by either receiving manually provided updates (e.g., an updated configuration script similar to a factory preloaded inventory described above) or auto-detecting the addition of infrastructure or removal of infrastructure from the system 100 by, for example, detecting changes in network connections advertised by infrastructure on the network 109.

In some implementations, information about the capabilities of the computers in the inventory may be discovered via baseboard management controllers of the computers, infrastructure management protocol communications, network discovery information (e.g., via Link Layer Discovery Protocol), and other discovery techniques. The inventory manager 120 and/or the logical rack controller 110 may perform the discovery. In some implementations, the logical rack controller 110 may perform the discovery and inform the provisioning contra ler 130 about the discovered infrastructure, while the inventory manager 120 listens to the provisioning controller 130 for infrastructure information. Capabilities may include processor, memory, storage, graphics processing unit (CPU), and other hardware, firmware, and software characteristics of the computers, and the capabilities may be stored in the inventory or in a separate data structure.

The logical rack controller 110 may receive a logical rack definition 160 that indicates selected physical infrastructure from among the inventory to form a logical rack 112. (Logical rack may be abbreviated "L-rack" in the Figures for conciseness). In some implementations, Day 0 operations at the vendor factory may involve defining in a logical rack definition 160 which infrastructure from the predefined inventory is to form a logical rack 112, and the gateway computer on which the logical rack controller 110 is executed may be factory preloaded or otherwise provided with that predefined logical rack definition 160. In other examples, during Day 1+ operations for example, a logical rack definition 160 may be provided by the operator or by the vendor (e.g., via the on-premise gateway).

The logical rack definition 160 may be a JSON (JavaScript Object Notation)-based model (i.e., a software construct) that maps physical infrastructure to a logical rack. In some implementations, the selected physical infrastructure indicated in the logical rack definition 160 may include computers, such as one or more of the computers 102, 104. Thus, a logical rack 112 may be (but is not necessarily) composed of computers (e.g., 102-1, 104-1) from different physical racks (e.g., 106, 108 respectively). The logical rack definition 160 may be designed for a particular workload. For example, a machine learning operations workload may select physical computer infrastructure from the inventory with CPUs.

In some implementations, the logical rack controller 110 may maintain the notion of a logical TOR switch 113 that is an abstraction of some or all of one or more physical TOR switches (e.g., 103 or 105) connected to the infrastructure of physical computing racks (106, 108). A logical TOR switch 113 may be a software model or construct, for example. The logical TOR switch 113 may be part of the logical rack definition 160 or may be a separate model associated with the logical rack definition 160.

From the perspective of a control plane in the system 100, a logical TOR switch 113 operates in a similar manner to a physical switch and supports similar management capabilities. For example, the logical TOR switch model may map some or all of the ports of one or more physical TOR switches 103, 105 to the ports of the logical TOR switch 113. Commands directed to logical TOR switch ports, such as VLAN (virtual local area network) or VXLAN (virtual extensible local area network) commands, link operations, telemetry commands, and the like will be directed via the logical rack controller 110 to the mapped ports of the physical TOR switch 103, 105.

To illustrate, FIG. 1 depicts in dashed lines a logical rack 112 that includes a logical TOR switch 113 modeled as a combination of ports of physical TOR switches 103, 105. By mapping ports of physical TOR switches 103, 105 in different physical racks 106, 108 to ports of a logical TOR switch 113, computers 102-1, 104-1 connected to the different physical TOR switches 103, 105 in separate physical racks 106, 108 can be combined into a single logical rack 112. Moreover, such a logical rack 112 may comprise bare metal computers 102, 104.

The logical rack definition 160 may specify which port(s) of a physical TOR switch a computer in the definition 160 is connected to. In some implementations, the logical rack definition 160 is factory predefined with this information, which may match the factory cabling of the physical rack. In some implementations, free and unused ports on physical TOR switches may be connected to a discovery network, installations of physical infrastructure (e.g., computers) may be connected to the free ports, and a service monitoring traffic on the discovery network (e.g., traffic such as DHCP requests) can initiate discovery of which newly installed computer is connected to which previously free port.

In addition to or as an alternative to Day 0 predefinition as a means to generate a logical rack definition 160, other techniques of creating or modifying a logical rack definition 160 may be utilized. In an example, the logical rack definition 160 may be manually defined, by the vendor or operator, at any point in time (e.g., Day 1+). Another example technique may be based on network visibility of physical infrastructure, where a logical rack definition 160 may be automatically generated from or modified to include any physical infrastructure that is newly detected and visible on the network 109, such as by a discovery method described above.

A policy driven logical rack membership may be another example technique. The logical rack controller 110 may be provided with a specification of desired characteristics for a logical rack. The characteristics may indicate, for example, "general compute workload", "machine learning operations workload", "CPU intensive", "memory intensive", "storage intensive", "GPU intensive", or the like. The logical rack controller 110 may have a policy or policies (i.e., rules or logic) to automatically create a logical rack definition 160 from inventory that aligns with the specified desired characteristics. For example, a policy may indicate that if "machine learning operations workload" is a desired characteristic, then computers with GPUs should be added to the logical rack. A policy may also indicate that computers without GPUs should be utilized for "general compute" logical racks, for example.

Having received a logical rack definition 160, the logical rack controller 110 reads and validates the logical rack definition 160 by verifying network connectivity of the selected physical infrastructure identified in the logical rack definition 160. Validation may include one or more of verifying that all physical infrastructure (e.g., computers 102, 104) in the logical rack definition 160 exist, verifying that any TOR switches (e.g., 103, 105) associated with the logical rack definition 160 exist, and verifying the existence of TOR switch-to-computer connections.

For example, the logical rack controller 110 may utilize information from the TOR switches 103, 105 through the Link Layer Discovery Protocol (LLDP) to perform the validation. Also, the logical rack controller 110 may utilize LLDP information to verify the existence of high availability links between each computer and more than one TOR switch. Accordingly, the logical rack controller 110 can use the LLDP information to verify that the logical rack model (e.g., connectivity between computers and a logical TOR switch 113 made up of physical TOR switches 103, 105) matches the physical reality. Other discovery protocols may be used in other implementations.

In some implementations, if the logical rack definition 160 fails validation (e.g., a piece of physical infrastructure does not exist or is not connected to the physical TOR switches as expected), an error condition may be reported, to the Saab portal or to the vendor for example. In some implementations, the logical rack controller 110 may attempt to automatically correct the validation errors by removing the non-validated physical infrastructure from the logical rack definition 160. In some implementations, the logical rack controller 110 may attempt to correct the validation errors by auto-detecting the correct network connections between physical TOR switches and the physical infrastructure and updating the logical rack definition 160 accordingly.

After the logical rack definition 160 has been validated (or corrected), the logical rack controller 110 persists the logical rack definition 160 by providing a logical rack interface 114 (which may be a set of interfaces) to the provisioning controller 130, In some implementations, the logical rack interface 114 may be defined based on the requirements or design of the provisioning controller 130 in order for the provisioning controller 130 to carry out a variety of tasks. For example, the interface 114 may provide a means (e.g., commands) for the provisioning controller 130 to prepare the logical rack 112 for an operation or application workload of the operator. More particularly, the provisioning controller 130 may use the interface 114 to communicate a request to the logical rack controller 110 to image or reimage one or more of the physical infrastructure (e.g., computer 102, 104) of the logical rack 112. To provision the operating system, the logical rack controller 110 may orchestrate bootstrapping of that physical infrastructure to an imaging server 150. For example, in an implementation, the logical rack controller 110 may use an infrastructure management protocol, such as the DMTF (Distributed Management Task Force) Redfish® standard, to reboot a computer 102 or 104 to a state that will communicate with an imaging server 150 (e.g., HTTPS boot to the imaging server), from which the computer 102 or 104 will install an operating system (OS) image.

In some implementations, the logical rack interface 114 may provide an interface by which the provisioning controller 130 may perform switch commands (e.g., commands related to configuration, performance, fault management, etc. of a switch) against the logical TOR switch 113 and/or physical TOR switches 103, 105. If commands are targeted at specific ports of a logical TOR switch 113, the logical rack controller 110 may map the commands to corresponding ports of a physical TOR switch 103, 105 according to the logical TOR switch model.

In some implementations, the logical rack interface 114 may provide an interface by which the provisioning controller 130 may manage one or more power distribution units (PDUs) of a physical rack 106, 108 that are associated with the logical rack 112. For example, certain PDUs may provide software control of the power state for a rack or for individual units of infrastructure within a rack. Thus, in response to a command over interface 114 to turn power on or off to a logical rack 112, the logical rack controller 110 may command the PDUs of the physical racks 106 or 108 housing the computers of the logical rack 112 to turn power on or off to those specific computers.

In some implementations, the logical rack controller 110 may abstract aspects of the computers of a logical rack 112, such as interfaces and connectivity (e.g., out-of-band communications, management network interfaces, serial ports, parallel ports, universal serial bus ports, etc.), and allow for control of those aspects by the provisioning controller 130 through the logical rack interface 114.

In some implementations, the logical rack controller 110 may also provide the provisioning controller 160 with information about the capabilities of the constituent computers of the logical rack 112, as discovered in the manner discussed above. By virtue of the capabilities information, the provisioning controller 130 may intelligently optimize the logical rack 112 for the operator's workload.

As discussed above, the inventory manager 120 may update the inventory as physical infrastructure available in system 100 changes. For example, new infrastructure may be added to the system 100 for various reasons such as an operator's increased capacity demands. Infrastructure may be removed from the system 100 for various reasons such as failure, decreased capacity demands, or reallocation to a different system. Infrastructure may be replaced (i.e., a combination of removing and adding) for various reasons such as replacement of failed infrastructure. The logical rack controller 110 may watch for changes at the inventory manager 120 or the inventory manager 120 may inform the logical rack controller 110 of changes. The logical rack controller 110 may receive an updated inventory 122 from the inventory manager 120.

In response to the changes in the updated inventory 122, the logical rack controller 110 may update the logical rack definition 150 by adding new physical infrastructure, removing the removed physical infrastructure, or replacing removed physical infrastructure with new physical infrastructure, in the previously validated logical rack definition 160. For example, the logical rack controller 110 may utilize policy driven logical rack membership as described above to add new infrastructure based on matching characteristics of an existing logical rack definition 160. Alternatively, newly added infrastructure may be claimed by added by default, for example, to a logical rack 112 that is associated with a logical TOR switch 113 that is mapped to physical TOR switch 103, 105 ports connected to the newly added infrastructure. As another alternative, the logical rack definition 160 may be manually edited. The logical rack controller 110 may revalidate the modified logical rack definition 160 in a similar manner to validation described above.

In some implementations, a logical rack controller 110 may also support multi-tenancy, where multiple logical racks are defined from the same inventory of physical infrastructure and at least some of the logical racks belong to different tenants. Different tenants can represent different operators or the same operator desiring isolation between workloads. To provide isolation between tenants, logical TOR switches are created for respective tenants that include mutually exclusive ports of physical TOR switches placed on isolated VLANs or VXLANs. In other implementations, other network isolation techniques may be utilized, Physical infrastructure connected to those logical TOR switches may be from the same inventory but are mutually exclusive to respective tenants. Thus, logical racks of respective tenants are isolated due to separate connectivity between the logical racks and logical TOR switches for respective tenants.

In some implementations, multiple logical rack controllers 110 or multiple instances of logical rack controller 110 may run concurrently in the system 100. For example, one logical rack controller or instance thereof may be deployed for each individual logical rack. For example, where a logical rack controller is run as a container pod, additional logical rack controller instances may be deployed as replicas by a container orchestrator. Separate logical racks created from the same inventory of physical infrastructure may be error-checked, using certificates or universally unique identifiers of computers for example, to ensure that any given computer is claimed by only one logical rack and associated logical rack controller.

For the sake of illustration, two racks 106, 108 and their included infrastructure are depicted, but it should be understood that the techniques described herein may be utilized with a different quantity of racks and different arrangements of infrastructure included therein. Additionally, the logical rack 112 is depicted as being comprised of elements of the racks 106, 108 (via the dashed arrows), but it should be understood that other logical racks may be created with different arrangements of infrastructure.

FIGS. 2-6 are flow diagrams depicting various example methods. In some implementations, one or more blocks of the methods may be executed substantially concurrently or in a different order than shown. In some implementations, a method may include more or fewer blocks than are shown. In some implementations, one or more of the blocks of a method may, at certain times, be ongoing and/or may repeat. In some implementations, blocks of the methods may be combined.

The methods shown in FIGS. 2-6 may be implemented in the form of executable instructions stored on a machine readable medium and executed by a processing resource and/or in the form of electronic circuitry. For example, aspects of the methods may be described below as being performed by a logical rack controller that is executing on a hardware processing resource (e.g., a CPU, a GPU, a DPU, an ASIC, an FPGA, an SOC, etc.). For example, the hardware processing resource may be part of an on-premise gateway computer installed at an operator's data center or coloration. Additionally, other aspects of the methods described below may be described with reference to other elements shown in FIG. 1 for non-limiting illustration purposes.

Figure 2:
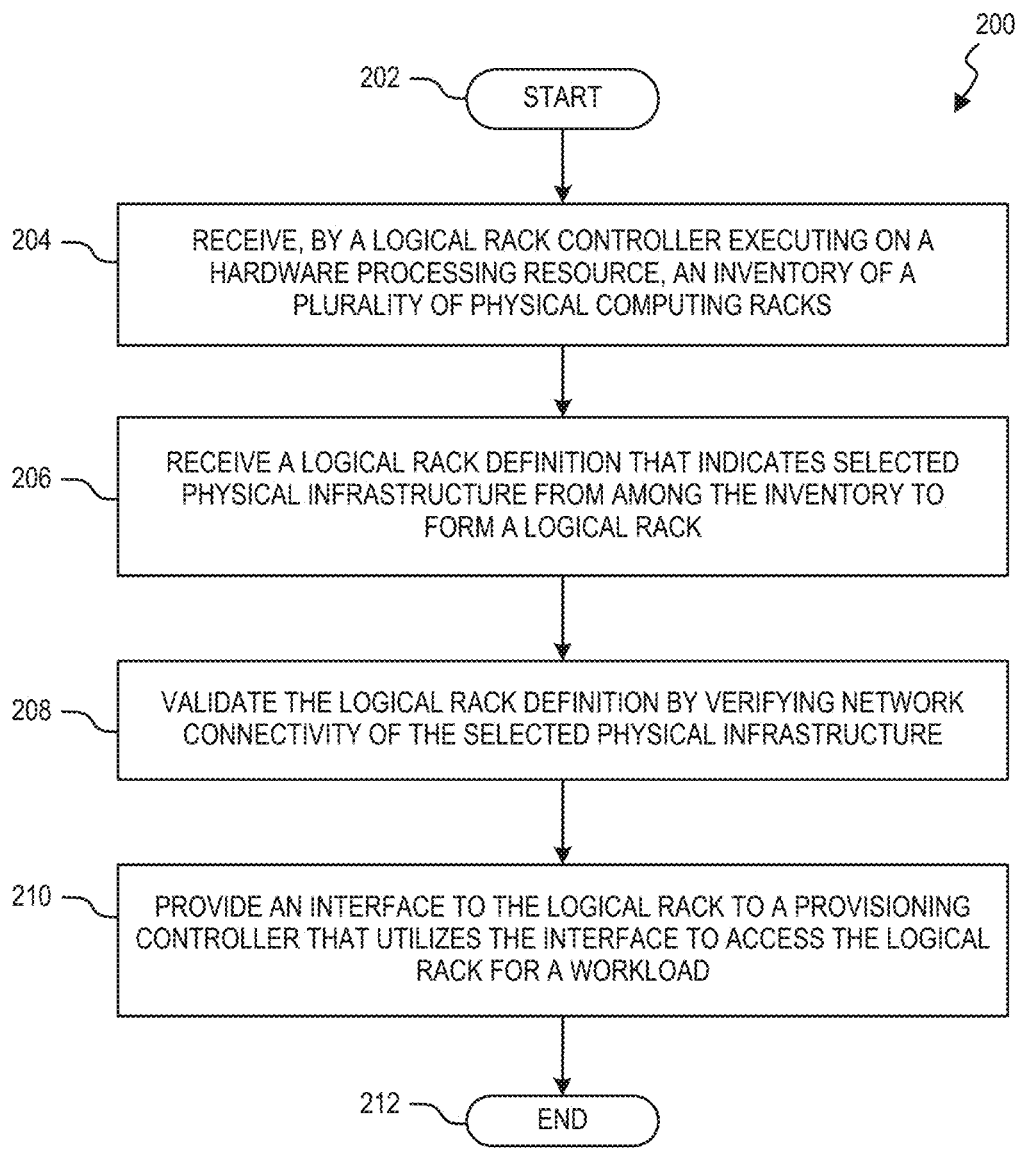
FIG. 2 is a flow chart of an example method that provides an interface to a logical rack.

FIG. 2 is a flow diagram depicting an example method 200. Method 200 starts at block 202 and continues to block 204 where a logical rack controller 110 executing on a hardware processing resource receives an inventory 122 about a plurality of physical computing racks 106, 108 (more or fewer racks are also contemplated). The inventory 122 may be retrieved from or sent by an inventory manager 120.

At block 206, the logical rack controller 110 receives a logical rack definition 160 that indicates selected physical infrastructure from among the inventory 122 to form a logical rack 112. As described above, the logical rack definition 160 may be generated by predefinition, manual definition, based on network visibility, based on policy driven logical rack membership, or other techniques.

At block 208, the logical rack controller 110 validates the logical rack definition by verifying network connectivity of the selected physical infrastructure. For example, the logical rack controller 110 may utilize LLDP information from a rack switch (e.g., 103, 105) associated with the logical rack definition 160 to confirm connectivity between the top of rack switch (e.g., 103, 105) and the computers (e.g., 102, 104) in the logical rack definition 160.

In some implementations, if the logical rack definition 160 fails validation, an error condition may be reported to the SaaS portal or otherwise to the vendor. Additionally or alternatively, the logical rack controller 110 may attempt to correct the validation errors in a manner described above.

After the logical rack definition is validated, at block 210, the logical rack controller 110 provides an interface 114 to the logical rack 112 to a provisioning controller 130. In some implementations, the provisioning controller 130 may be included in a SaaS portal in the cloud operated by the infrastructure vendor. The interface 114 (which may be a set of interfaces) may be used by the provisioning controller 130 to prepare and use the logical rack 112 for the operator's workload, such as machine learning operators or other workloads. The method 200 ends at block 212.

Figure 3:
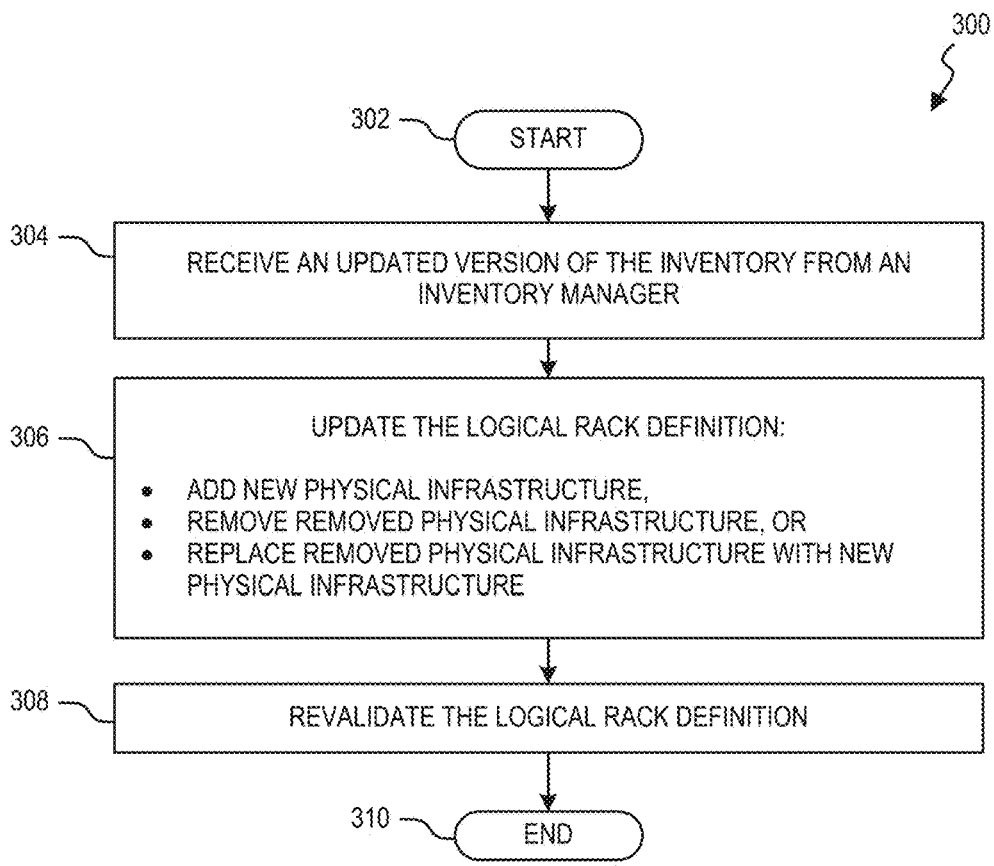
FIG. 3 is a flow chart of an example method that updates a logical rack definition.

FIG. 3 is a flow diagram depicting an example method 300. Method 300 may be useful in some logical rack lifecycle scenarios such as, for example, when physical infrastructure is added, removed, or replaced in the inventory. Method 300 starts at block 302 and continues to block 304 where the logical rack controller 110 receives an updated version of the inventory 122 from the inventory manager 120.

At block 306, the logical rack controller 110 updates the logical rack definition 160 by adding new physical infrastructure indicated in the updated version of the inventory 122 to the logical rack definition 160, removing removed physical infrastructure as indicated in the updated version of the inventory 122 from the logical rack definition 160, or by replacing the removed physical infrastructure with the new physical infrastructure in the logical rack definition 160.

At block 308, the logical rack controller 110 revalidates the updated logical rack definition 160. In some implementations, the logical rack controller 110 may provide an updated logical rack interface 114 to the provisioning controller 130, such that the provisioning controller 130 is notified of changes to the logical rack 112. The method 300 ends at block 310.

Figure 4:
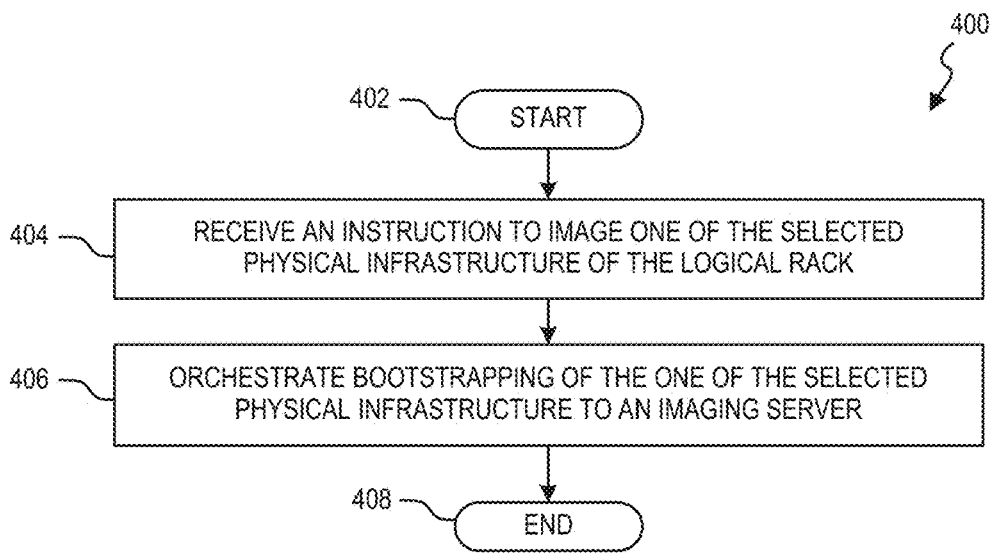
FIG. 4 is a flow chart of an example method that orchestrates bootstrapping of infrastructure to an imaging server.

FIG. 4 is a flow diagram depicting an example method 400. Method 400 may be useful for imaging a validated logical rack 112, which may be further useful for preparing the logical rack 112 for lifecycle management operations on the physical infrastructure represented by the logical rack 112. The method 400 starts at block 402 and continues to block 404 where the logical rack controller 110 receives an instruction from the provisioning controller 130 (e.g., via the logical rack interface 114) to image one or more of the selected physical infrastructure (e.g., a computer 102, 104) of the logical rack 112.

At block 406 and in response to the instruction, the logical rack controller 110 may orchestrate bootstrapping of the one of the selected physical infrastructure (e.g., computer 102, 104) to an imaging server 150. For example as discussed above, the logical rack controller 110 may use an infrastructure management protocol to boot the computer 102, 104 to the imaging server 150 from which an OS image is installed on the computer 102, 104. The method 400 ends at block 408.

Figure 5:
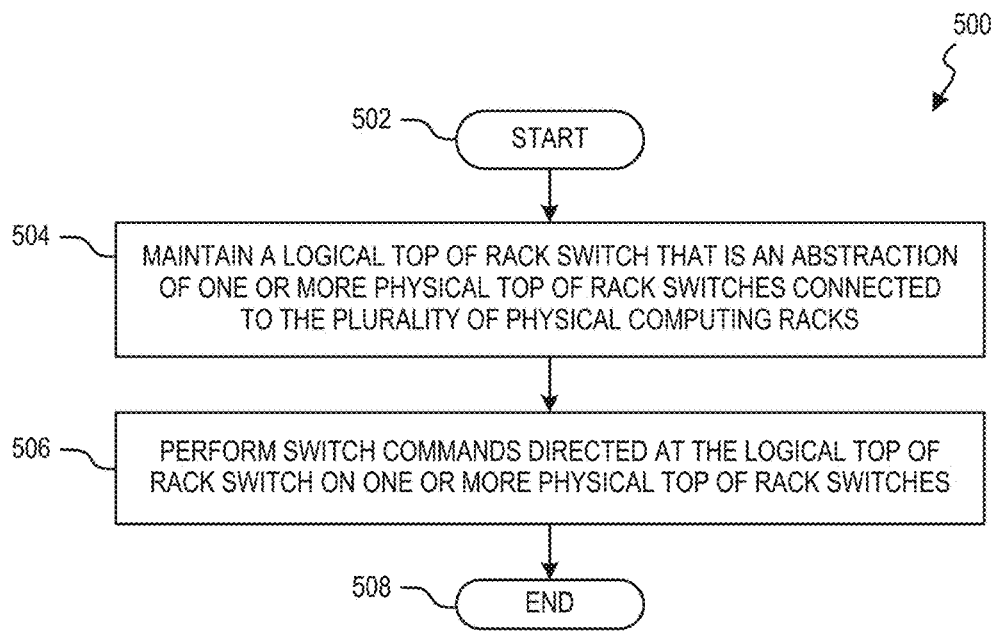
FIG. 5 is a flow chart of an example method that performs switch commands directed at a logical top of rack switch.

FIG. 5 is a flow diagram depicting an example method 500. Method 500 may be useful providing and managing a logical top of rack switch (e.g., 113), which may be used by the provisioning controller 130 and other parts of the environment such as a data center control plane as if it were a physical TOR switch.

The method 500 starts at block 502 and continues to block 504 where the logical rack controller 110 maintains a logical TOR switch 113 that is an abstraction of at least a portion of one or more physical top of rack switches (e.g., 103, 105, etc.). In some implementations, the logical TOR switch 113 is a software model that maps ports of the logical TOR switch 113 to ports of one or more physical TOR switches. In some examples, the logical TOR switch 113 may map to a some (e.g., a subset) or all ports of one or more physical TOR switches. Different physical TOR switches may be connected to separate respective physical computing racks (e.g., 106, 108, etc.).

In some implementations, the logical rack controller 110 may provide an interface to the logical TOR rack 113, which may be accessed by the provisioning controller 130 for example. The provisioning controller 130 or other software or hardware modules may send switch commands to the logical TOR switch 113 via that interface. The switch commands may relate, for example to configuration, performance, fault management, etc., and may target specific ports of the logical TOR switch 113.

At block 506, the logical rack controller 110 may determine which ports of the physical TOR switches 103, 105 a logical TOR switch command is mapped to via the logical TOR switch model and perform the switch commands on the determined ports of the physical TOR switches 103, 105. The method 500 ends at block 508.

Figure 6:
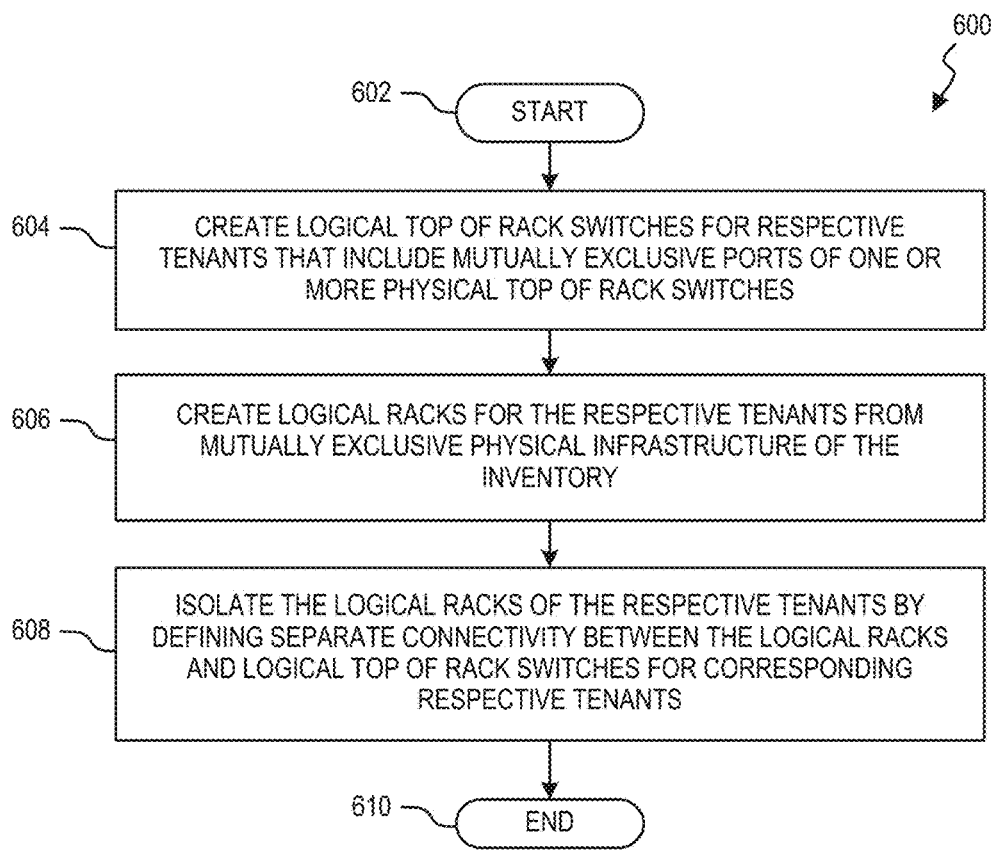
FIG. 6 is a flow chart of an example method that creates logical racks for respective tenants.

FIG. 6 is a flow diagram depicting an example method 600. Method 600 may be useful for providing logical racks from inventory in a manner that supports multi-tenancy. The method 600 starts at block 602 and continues to block 604 where a logical rack controller 110 creates logical TOR switches for respective tenants that include mutually exclusive ports of one or more physical TOR switches connected to the plurality of physical computing racks of the inventory. To illustrate, a first logical TOR switch (or a first set of logical TOR switches) may be created from a set of ports of one or more physical TOR switches for a first tenant, and a second logical TOR switch (or a second set of logical TOR switches) may be created from a different, mutually exclusive, set of ports of one or more physical TOR switches for a second tenant. The physical TOR switches from which the logical TOR switches are composed may or may not overlap. In some implementations, the logical rack controller 110 may be multiple cooperating instances (e.g., replica container pods), one instance to manage each logical rack.

At block 606, the logical rack controller 110 creates logical racks for the respective tenants from mutually exclusive physical infrastructure of the inventory. For example, a computer that is assigned to a first tenant's logical rack is excluded from being assigned to any other tenant's logical rack.

At block 608, the logical rack controller 110 isolates the logical racks of the respective tenants by defining separate connectivity between the logical racks and logical top of rack switches for corresponding respective tenants. For example, the network connections (e.g., connections between source and destination ports) in a first tenant's logical rack may be placed on a VLAN or VXLAN, and the network connections in a second tenant's logical rack may be placed on a different VLAN or VXLAN. The method 600 ends at block 610.

Figure 7:
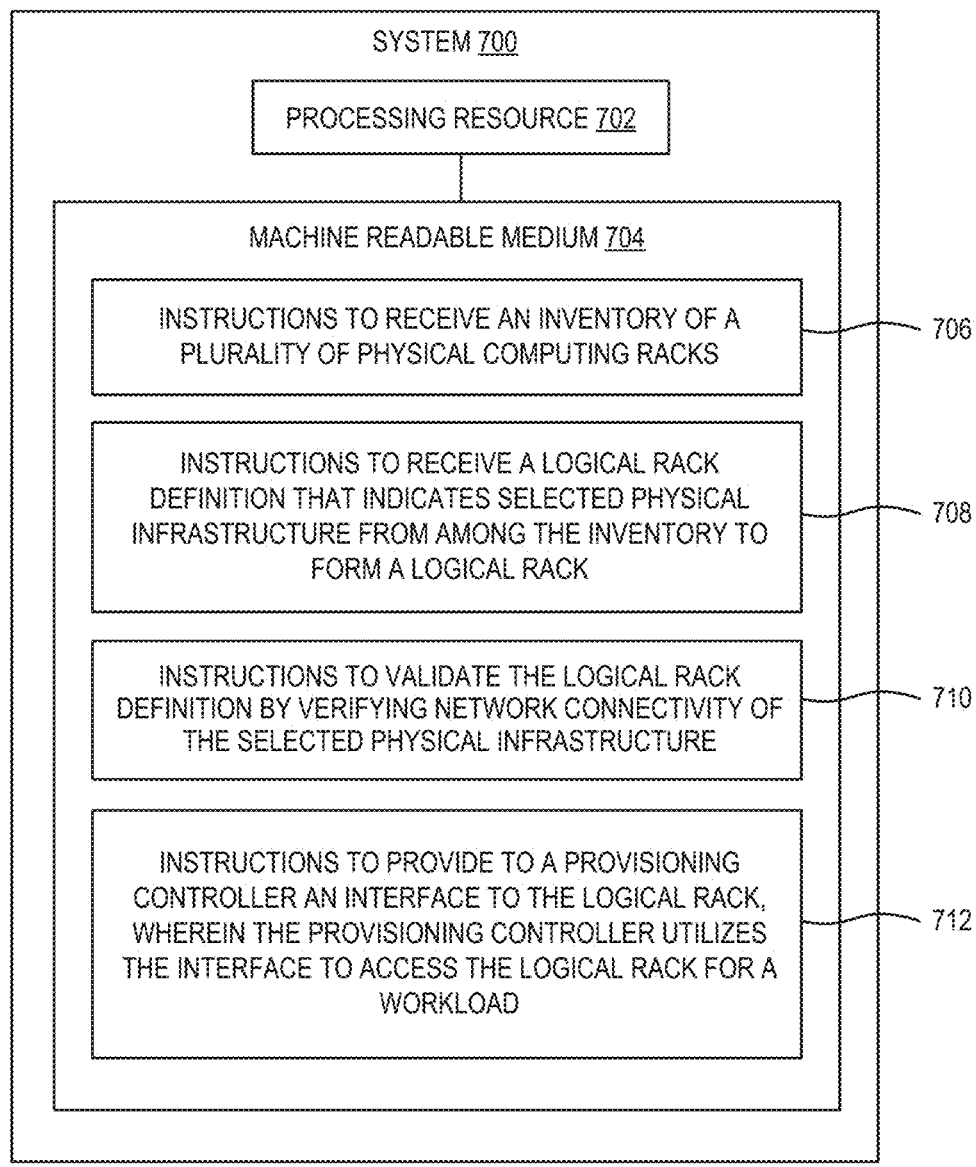
FIG. 7 is a block diagram of an example system with a machine readable medium that includes instructions to provide an interface to a logical rack.

FIG. 7 depicts an example system 700 that includes a non-transitory, machine readable medium 704 encoded with example instructions 706, 708, 710, 712 (collectively referred to as instructions 706-712) executable by a processing resource 702. In some implementations, the system 700 may be useful for implementing aspects of the logical rack controller 110 of FIG. 1 or for performing blocks of method 200 of FIG. 2. Similarly, aspects described above with respect to FIGS. 1 and 2 may be applicable to system 700. Aspects of the instructions described below may be described with reference to elements of FIG. 1 for non-limiting illustration purposes.

The processing resource 702 may include a microcontroller, a microprocessor, central processing unit core(s), an ASIC, an FPGA, an SOC, and/or other hardware device suitable for retrieval and/or execution of instructions from the machine readable medium 704 to perform functions related to various examples. Additionally or alternatively, the processing resource 702 may include or be coupled to electronic circuitry or dedicated logic for performing some or all of the functionality of the instructions described herein.

The machine readable medium 704 may be any medium suitable for storing executable instructions, such as RAM, ROM, EEPROM, flash memory, a hard disk drive, an optical disc, or the like. In some example implementations, the machine readable medium 704 may be a tangible, non-transitory medium. The machine readable medium 704 may be disposed within the system 700, in which case the executable instructions may be deemed installed or embedded on the system 700. Alternatively, the machine readable medium 704 may be a portable (e.g., external) storage medium, and may be part of an installation package.

As described further herein below, the machine readable medium 704 may be encoded with a set of executable instructions 706, 708, 710, 712. It should be understood that part or all of the executable instructions and/or electronic circuits included within one box may, in alternate implementations, be included in a different box shown in the figures or in a different box not shown. Some implementations of the system 700 may include more or fewer instructions than are shown in FIG. 7.

Instructions 706, when executed, cause the processing resource 702 to receive an inventory 122 about a plurality of physical computing racks 106, 108. The inventory may include computers 102, 104, for example. More particularly, the computers may be bare metal servers.

Instructions 708, when executed, cause the processing resource 702 to receive a logical rack definition 160 that indicates selected physical infrastructure from among the inventory 122 to form a logical rack 112. For example, the logical rack definition 160 may be based on a predefined specification that indicates the selected physical infrastructure, network visibility of the selected physical infrastructure to the logical rack controller, or application of policy-defined characteristics to the inventory to identify the selected physical infrastructure.

Instructions 710, when executed, cause the processing resource 702 to validate the logical rack definition 160 by verifying network connectivity of the selected physical infrastructure. For example, instructions 710 may utilize LLDP information to verify network connectivity.

Instructions 712 may be executed after validation of the logical rack definition to cause the processing resource 702 to provide to a provisioning controller 130 an interface 114 to the logical rack 112. The provisioning controller 130 utilizes the interface 114 to access the logical rack 112 to, for example, perform lifecycle management operations on the physical infrastructure represented by the logical rack 112.

Figure 8:
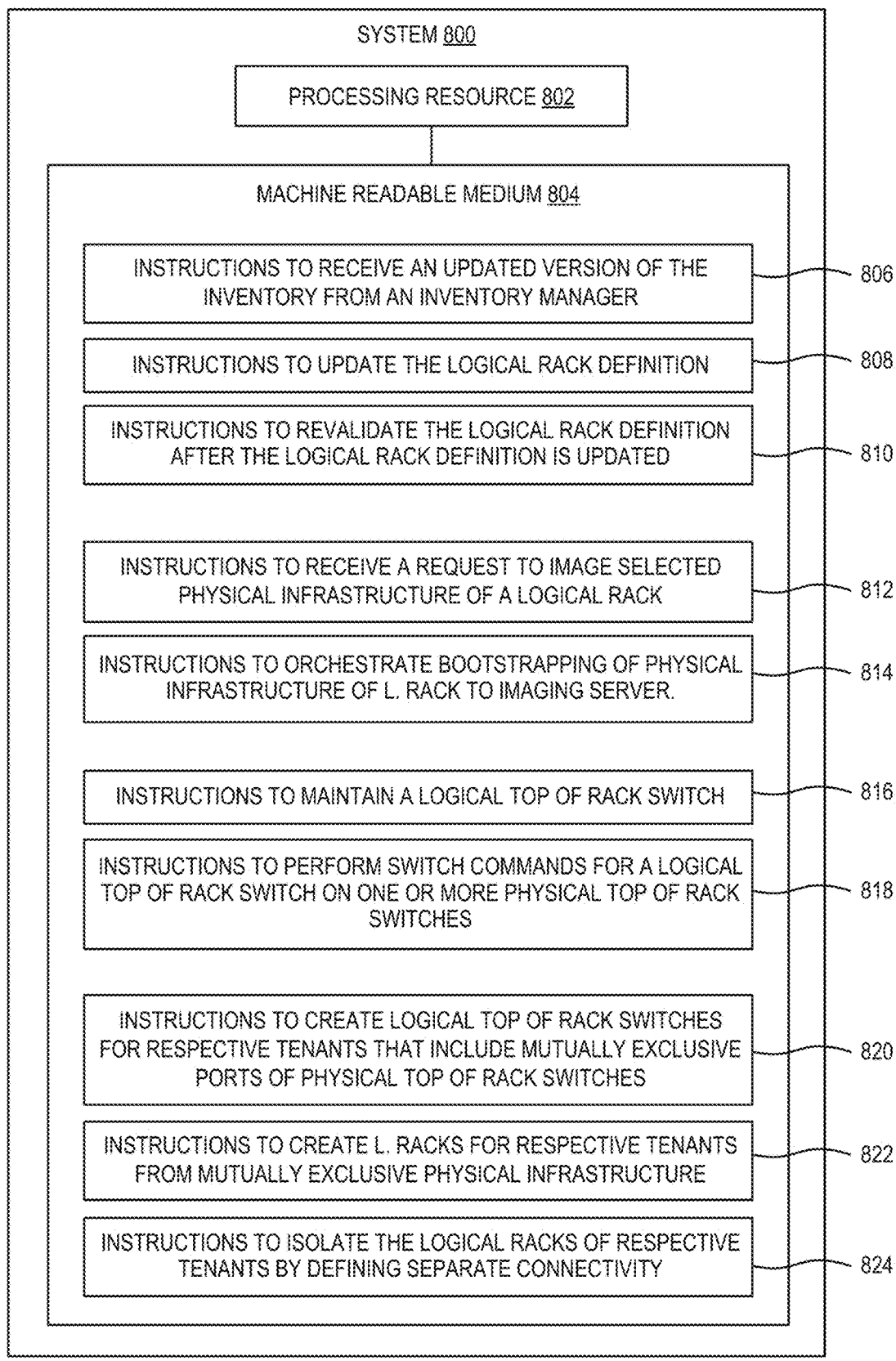
FIG. 8 is a block diagram of an example system with a machine readable medium that includes instructions related to logical racks and logical top of rack switches.

FIG. 8 depicts an example system 800 that includes a processing resource 802 coupled to a non-transitory, machine readable medium 804 encoded with example instructions. The processing resource 802 and the machine readable medium 804 may be analogous in many respects to the processing resource 702 and the machine readable medium 704, respectively. In some implementations, the system 800 may be useful for implementing aspects of the logical rack controller 110 of FIG. 1 or for performing blocks of the methods of FIGS. 3-6. Similarly, aspects described above with respect to FIGS. 1-2 may be applicable to system 800. Aspects of the instructions described below may be described with reference to elements of FIG. 1 for non-limiting illustration purposes.

The machine readable medium 804 may be encoded with a set of executable instructions 806, 808, 810, 812, 814, 816, 818, 820, 822, 824 (collectively 806-824). It should be understood that part or all of the executable instructions and/or electronic circuits included within one box may, in alternate implementations, be included in a different box shown in the figures or in a different box not shown. Some implementations of may include more or fewer instructions than are shown in FIG. 8. In some implementations, one or more of the instructions 806-824 may operate in conjunction or in combination with one or more of the instructions 706-712 described above.

Instructions 806, when executed, cause the processing resource 802 to receive an updated version of an inventory 122 from an inventory manager 120. Instructions 8080, when executed, cause the processing resource 802 to update a logical rack definition 160 by adding new physical infrastructure indicated in the updated version of the inventory 122 to the logical rack definition 160, removing removed physical infrastructure indicated in the updated version of the inventory 122 from the logical rack definition 160, or replacing the removed physical infrastructure with the new physical infrastructure in the logical rack definition 160. Instructions 810, when executed, cause the processing resource 802 to revalidate the logical rack definition 160 updated by instructions 808. Revalidation may perform instructions 710 on the updated logical rack definition 160, for example.

Instructions 812, when executed, cause the processing resource 802 to receive from the provisioning controller 130 a request to image one or more of the selected physical infrastructure (e.g., computers 102, 104) of the logical rack 112. Instructions 814, when executed, cause the processing resource 802 to respond to the request by orchestrating a bootstrapping of the one of the selected physical infrastructure to an imaging server 150.

Instructions 816, when executed, cause the processing resource 802 to maintain a logical TOR switch 113 that is an abstraction of at least a portion of one or more physical TOR switches 103, 105. The physical TOR switches 103, 105 may be connected to the plurality of physical computing racks in the inventory 122. Instructions 818, when executed, cause the processing resource 802 to perform, on the one or more physical TOR switches 103, 105, switch commands directed at the logical TOR switch 113 according to the abstraction (i.e., mapping) of the logical TOR switch model. The switch commands may be received from the provisioning controller 130.

Instructions 820, when executed, cause the processing resource to create logical top of rack switches for respective tenants that include mutually exclusive ports of one or more physical top of rack switches connected to the plurality of physical computing racks of the inventory. Instructions 822, when executed, cause the processing resource to create logical racks for the respective tenants from mutually exclusive physical infrastructure of the inventory. Instructions 824, when executed, cause the processing resource to isolate the logical racks of the respective tenants by defining separate connectivity between the logical racks and logical top of rack switches for corresponding respective tenants.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed:

1. A method comprising:
receiving, by a logical rack controller executing on a hardware processing resource, an inventory of a plurality of physical computing racks, wherein the inventory indicates physical infrastructure components;
receiving, by the logical rack controller, a logical rack definition that indicates a selected subset of physical infrastructure components from among the inventory to form a logical rack that is a logical collection of physical infrastructure components organized in a different manner than the physical infrastructure components of the inventory;
validating, by the logical rack controller, the logical rack definition by verifying network connectivity of the selected subset of physical infrastructure components;
after validation of the logical rack definition, providing, by the logical rack controller and to a provisioning controller, an interface to the logical rack, wherein the provisioning controller utilizes the interface to access the logical rack;
maintaining a logical top of rack switch that is an abstraction of at least a portion of one or more physical top of rack switches connected to the plurality of physical computing racks; and
performing, by the logical rack controller and on the one or more physical top of rack switches, switch commands directed to the logical top of rack switch according to the abstraction.

2. The method of claim 1, further comprising:
receiving an updated version of the inventory from an inventory manager; and
updating, by the logical rack controller, the logical rack definition by:
adding a new physical infrastructure component indicated in the updated version of the inventory to the logical rack definition,
removing a removed physical infrastructure component indicated in the updated version of the inventory from the logical rack definition, or
replacing the removed physical infrastructure component with the new physical infrastructure component in the logical rack definition; and
revalidating the logical rack definition after the updating of the logical rack definition.

3. The method of claim 1, further comprising:
receiving, by the logical rack controller and from the provisioning controller, a request to image one or more of the selected subset of physical infrastructure components of the logical rack; and
in response to the request, orchestrating bootstrapping of the one of the selected subset of physical infrastructure components to an imaging server.

4. The method of claim 1, wherein the selected physical infrastructure includes computers, and
the verifying network connectivity includes using link layer discovery protocol information from the one or more physical top of rack switches associated with the logical rack definition to confirm connectivity between the one or more physical top of rack switches and the computers.

5. The method of claim 1, further comprising:
creating logical top of rack switches, including the logical top of rack switch, for respective tenants that include mutually exclusive ports of one or more physical top of rack switches connected to the plurality of physical computing racks of the inventory;
creating logical racks, including the logical rack, for the respective tenants from mutually exclusive physical infrastructure of the inventory; and
isolating the logical racks of the respective tenants by isolating the respective ports of the respective logical top of rack switches for corresponding respective tenants.

6. The method of claim 1, wherein the logical rack definition is based on a predefined specification that indicates the selected physical infrastructure, network visibility of the selected physical infrastructure to the logical rack controller, or application of policy-defined characteristics to the inventory to identify the selected physical infrastructure.

7. A non-transitory machine readable medium storing instructions for a logical rack controller that are executable by a hardware processing resource, the instructions for the logical rack controller comprising:

instructions to receive an inventory of a plurality of physical computing racks, wherein the inventory indicates physical infrastructure components;

instructions to receive a logical rack definition that indicates a selected subset of physical infrastructure components from among the inventory to form a logical rack that is a logical collection of physical infrastructure components organized in a different manner than the physical infrastructure components of the inventory;

instructions to validate the logical rack definition by verifying network connectivity of the selected subset of physical infrastructure components;

instructions to provide to a provisioning controller, after validation of the logical rack definition, an interface to the logical rack, wherein the provisioning controller utilizes the interface to access the logical rack to perform lifecycle management operations on the selected subset of physical infrastructure components in the logical rack;

instructions to maintain a logical top of rack switch that is an abstraction of at least a portion of one or more physical top of rack switches connected to the plurality of physical computing racks; and instructions to perform, on the one or more physical top of rack switches, switch commands directed to the logical top of rack switch according to the abstraction.

8. The non-transitory machine readable medium of claim 7, wherein the instructions for the logical rack controller further comprise:

instructions to receive an updated version of the inventory from an inventory manager; and instructions to update the logical rack definition by:

adding new a physical infrastructure component indicated in the updated version of the inventory to the logical rack definition, removing a removed physical infrastructure component indicated in the updated version of the inventory from the logical rack definition, or replacing the removed physical infrastructure component with the new physical infrastructure component in the logical rack definition; and instructions to revalidate the logical rack definition after the logical rack definition is updated.

9. The non-transitory machine readable medium of claim 7, wherein the instructions for the logical rack controller further comprise:

instructions to receive from the provisioning controller a request to image one or more of the selected subset of physical infrastructure components of the logical rack; and instructions to respond to the request by orchestrating a bootstrapping of the one of the selected subset of physical infrastructure components to an imaging server.

10. The non-transitory machine readable medium of claim 7, wherein the selected physical infrastructure includes computers, and the instructions to validate the logical rack definition includes using link layer discovery protocol information from the one or more physical top of rack switches associated with the logical rack definition to confirm connectivity between the one or more physical top of rack switches and the computers.

11. The non-transitory machine readable medium of claim 7, wherein the instructions for the logical rack controller further comprise:

instructions to create logical top of rack switches, including the logical top of rack switch, for respective tenants that include mutually exclusive ports of the one or more physical top of rack switches connected to the plurality of physical computing racks of the inventory;

instructions to create logical racks, including the logical rack, for the respective tenants from mutually exclusive physical infrastructure of the inventory; and instructions to isolate the logical racks of the respective tenants by isolating the respective ports of the respective logical top of rack switches for corresponding respective tenants.

12. The non-transitory machine readable medium of claim 7, wherein the logical rack definition is based on a predefined specification that indicates the selected physical infrastructure, network visibility of the selected physical infrastructure to the logical rack controller, or application of policy-defined characteristics to the inventory to identify the selected physical infrastructure.

13. A system comprising:

a processing resource; and a non-transitory machine readable medium storing instructions for a logical rack controller that, when executed, cause the processing resource to:

receive an inventory of a plurality of physical computing racks, wherein the inventory indicates physical infrastructure components;

receive a logical rack definition that indicates a selected subset of physical infrastructure components from among the inventory to form a logical rack that is a logical collection of physical infrastructure components organized in a different manner than the physical infrastructure components of the inventory;

validate the logical rack definition by verifying network connectivity of the selected subset of physical infrastructure components;

provide to a provisioning controller, after validation of the logical rack definition, an interface to the logical rack, wherein the provisioning controller utilizes the interface to access the logical rack;

maintain a logical top of rack switch that is an abstraction of at least a portion of one or more physical top of rack switches connected to the plurality of physical computing racks; and perform, on the one or more physical top of rack switches, switch commands directed to the logical top of rack switch according to the abstraction.

14. The system of claim 13, wherein the instructions, when executed, cause the processing resource to:

receive an updated version of the inventory from an inventory manager; and update the logical rack definition by:

adding a new physical infrastructure component indicated in the updated version of the inventory to the logical rack definition, removing a removed physical infrastructure component indicated in the updated version of the inventory from the logical rack definition, or replacing the removed physical infrastructure component with the new physical infrastructure component in the logical rack definition; and revalidate the logical rack definition after the logical rack definition is updated.

15. The system of claim 13, wherein the selected physical infrastructure includes computers, and the instructions that cause the processing resource to validate the logical rack definition includes instructions to use link layer discovery protocol information from the one or more physical top of rack switches associated with the logical rack definition to confirm connectivity between the one or more physical top of rack switches and the computers.

16. The system of claim 13, wherein the instructions, when executed, cause the processing resource to:

create logical top of rack switches, including the logical top of rack switch, for respective tenants that include mutually exclusive ports of one or more physical top of rack switches connected to the plurality of physical computing racks of the inventory;

create logical racks, including the logical rack, for the respective tenants from mutually exclusive physical infrastructure of the inventory; and isolate the logical racks of the respective tenants by isolating the respective ports of the respective logical top of rack switches for corresponding respective tenants.

17. The system of claim 13, wherein the logical rack definition is based on a predefined specification that indicates the selected physical infrastructure, network visibility of the selected physical infrastructure to the logical rack controller, or application of policy-defined characteristics to the inventory to identify the selected physical infrastructure.

* * * * *